United States Patent [19]

Nieh et al.

[11] Patent Number: 4,795,581
[45] Date of Patent: Jan. 3, 1989

[54] AQUEOUS FLUIDS THICKENED WITH FATTY ACID MODIFIED POLYOXYALKYLENE DIAMINES

[75] Inventors: Edward C. Y. Nieh, Austin; Jiang-Jen Lin, Round Rock; George P. Speranza, Austin, all of Tex.

[73] Assignee: Texaco Inc., White Plains, N.Y.

[21] Appl. No.: 36,650

[22] Filed: Apr. 10, 1987

[51] Int. Cl.$^4$ ........................................... C01M 173/02
[52] U.S. Cl. ..................... 252/77; 252/49.3; 252/73; 252/75; 260/404.5; 528/332; 528/335; 528/422
[58] Field of Search ................... 252/49.3, 73, 75, 77; 528/332, 335, 422; 260/404.5

[56] References Cited

U.S. PATENT DOCUMENTS

| | | | |
|---|---|---|---|
| 3,992,312 | 11/1976 | Genjida et al. | 252/51.5 A |
| 4,310,436 | 1/1982 | Camp | 252/78.5 |
| 4,390,440 | 6/1983 | Schwartz et al. | 252/76 |
| 4,606,837 | 8/1986 | McEntire et al. | 252/73 |
| 4,664,834 | 5/1987 | Forsberg | 252/77 |

Primary Examiner—Robert A. Wax
Attorney, Agent, or Firm—Jack H. Park; Kenneth R. Priem; Richard A. Morgan

[57] ABSTRACT

Aqueous fluids are thickened with fatty acid modified polyoxyalkylene diamines. The polyoxyalkylene diamines are of the formula:

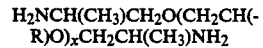

wherein:
  R is methyl or hydrogen and
  x is a number selected to give the diamine a molecular weight of 3000 to 9000.

The fatty acid is a hydrophobic mono- or dicarboxylaic acid of 12 to 36 carbon atoms. The ratio of amine equivalent: acid ranges from 1:0.5 to 1:1.

The aqueous fluids optionally incorporate ethylene glycol. They are useful for water/glycol based hydraulic fluids, cosmetics and surfactants.

20 Claims, No Drawings

AQUEOUS FLUIDS THICKENED WITH FATTY ACID MODIFIED POLYOXYALKYLENE DIAMINES

BACKGROUND OF THE INVENTION

Field of the Invention

The invention relates to thickened aqueous fluids. More specifically, the invention relates to aqueous fluids thickened with the reaction product of a selected 3000 to 9000 molecular weight polyoxyalkylene diamine with a hydrophobic fatty acid.

The thickened fluids are useful for water/ethylene glycol based hydraulic fluids, cosmetics and surfactant solutions.

Other Thickeners in the Field

U.S. Pat. No. 4,396,499 to McCoy et al. discloses water-soluble salts of polymers prepared by the reaction of polyoxyalkylene diamines with diepoxides. The diamines are of the formula: $H_2NCH(CH_3)CH_2O(CH_2CH(R)O)_xCH_2CH(CH_3)NH_2$.

U.S. Pat. No. 4,606,837 to McEntire et al. discloses water-glycol fluids made from polyoxyalkylene thickeners. These thickeners are prepared by the reaction of ethylene oxide with a 10 to 50 carbon atom hydrophobe such as dinonylphenyl in a specified ratio.

U.S. Pat. Nos. 4,310,436 and 4,354,956 to Camp disclose polyethylene glycol fatty acid diesters used as thickening agents. U.S. Pat. No. 4,395,351 to Camp discloses ethylene oxide adducts of coconut fatty acid amine, cocoa fatty acid and oleic acid for use as thickeners.

U.S. Pat. No. 4,390,440 to Schwartz et al. discloses a carboxylic acid having 5 to 20 carbon atoms, a thickener which is a polyether polyol of molecular weight of 1000 to 40,000 prepared by reacting ethylene oxide with at least one active hydrogen-containing compound and at least one alpha-olefin oxide or alcohol or glycidyl ether.

U.S. Pat. No. 3,992,312 to Genjida et al. discloses thickeners comprising a water-soluble polymer. The polymer contains a polyamide residue bonded to an oxyalkylene chain. Suitable polyamides include the condensation product of a polycarboxylic acid and a polyamine. Examples of polycarboxylic acids include adipic acid and polymerized fatty acids (dimer acids). Suitable polyamines include aliphatic polyamines such as ethylene diamine, propylene diamine and butylene diamine.

SUMMARY OF THE INVENTION

The invention concerns water based fluids comprising an effective amount of a thickener. The thickener is the reaction product of a polyoxyalkylene diamine and a hydrophobic fatty acid. The diamine is of the formula:

$H_2NCH(CH_3)CH_2O(CH_2CH(R)O)_xCH_2CH(CH_3)NH_2$.

About 1% to 30% of R is methyl with the balance being hydrogen. The number x is a value that specifies the molecular weight of the polyoxyalkylene diamine in the range of 3000 to 9000. The hydrophobic fatty acid is a mono- or dicarboxylic acid of 12 to 36 carbon atoms. The ratio of amine equivalent: acid ranges from 1:0.5 to 1:1.

DESCRIPTION OF THE PREFERRED EMBODIMENTS

The thickeners of the invention are useful for thickening water or an aqueous solution of organic solvents. These thickeners have a relatively low molecular weight for their effectiveness in thickening. Low molecular weight thickeners are more stable to shear degradation than high molecular weight compounds. This makes them useful for thickening water and water-/glycol based hydraulic fluids.

Fatty acids useful in making the thickeners of the instant invention include monocarboxylic and dicarboxylic acids derived from animal or vegetable fats or oils or the synthetic equivalents. These may include the saturated fatty acids such as lauric acid, palmitic acid and stearic acid. They may include the saturated fatty acids such as oleic acid, linoleic acid, linolenic acid and palmitoleic acid. Oleic acid, adipic acid and a mixture of $C_{36}$ dimer acids are shown in the Example to work well.

Diamines used to formulate the thickeners of the invention are commercially available as Jeffamine  ED-6075, ED-6000 and ED-4000. The amine function gives the thickener reserve alkalinity and provides rust inhibition.

The thickener formulations are prepared by stirring the constituents in a stainless steel kettle at 60° C. to 100° C. The blends are then diluted with the desired amount of water or organic solvent to make the concentrate. The fluids are shipped as concentrates. Before use they are diluted with water and optionally ethylene glycol, typically 1 wt% to 30 wt%, preferably 5 wt% to 20 wt% concentrate in water.

The thickening efficiency is controlled over a wide range by varying the size of the alkyl group in the carboxylic acid modifier or by varying the amine to acid ratio.

This invention is shown by way of example.

EXAMPLE

Jeffamine ® ED-6075 is a 5400 molecular weight polyoxyalkylene diamine product made by Ni/Cu/Cr catalyzed reductive amination of a corresponding polyoxyalkylene diol consisting of 75% of oxyethylene units and 22% of oxypropylene units ramdomly distributed in the main segment and 3% oxypropylene units at the end of the polymer chain. The reductive amination was conducted in a 1.5 liter tubular reactor filled with 1.2 liter of Ni/Cu/Cr catalyst (described in U.S. Pat. No. 3,654,370 to Yeakey, incorporated herein by reference) maintained at 204° C. and 2000 psia pressure. To the reactor was fed the above-mentioned polyoxyalkylene diol, ammonia and hydrogen at respective rates of 0.43 lb/hr., 1.04 lb/hr. and 35 liter/hr. The effluents were collected for the last 23 hour period of the 26 hour period. The effluent was stripped of volatiles and analyzed as followed: 0.37 meq/g total acetylable 0.30 meq/g total amines, 0.28 meq/g primary amines and 0.05 wt% water. The melting point of this product was 30° C.

Jeffamine ® ED-6000 is a 6350 molecular weight polyoxyalkylene diamine product made by Ni/Cu/Cr catalyzed reductive amination of a corresponding polyoxyalkylene diol consisting of mostly oxyethylene units and 3.5% of oxypropylene units at the end of the polymer chain. The reductive amination reaction was conducted in a similar manner as for ED-6075. The stripped product analyzed as followed: 0.315 meq/g total acetylable, 0.27 meq/g total amine, 0.25 meq/g primary amines and 0.05 wt% water. The melting point of the product was 57° C.

Jeffamine® ED-4000 is a 3846 molecular weight polyoxyalkylene diamine product made by Ni/Cu/Cr catalyzed reductive amination of a corresponding polyoxyalkylene diol consisting of mostly oxyethylene units and 3.5% of oxypropylene units at the end of the polymer chain. The reductive amination reaction was conducted in a similar manner as ED-6075. The stripped product analyzed as followed: 0.52 meq/g total amine, 0.45 meq/g total amine, 0.45 primary amine and 0.23% water. The melting point of the product was 54° C.

General Synthesis

Quantities of polyoxyalkylene diamine and fatty acid modifier were admixed in a glass vial and heated to 220° C. for a period of 4 hours under a nitrogen atmosphere. No catalyst was used, however an acid or base catalyst is useful for some reagents. The completion of the reaction was indicated when a 10% aqueous solution of the resulting product was clear at ambient temperature as well as temperatures below the cloud point of the product (generally greater than 65° C.). The results of these reactions are summarized in Table 1.

While particular embodiments of the invention have been described, it is well understood that the invention is not limited thereto since modifications may be made. It is therefore contemplated to cover by the appended claims any such modifications as fall within the spirit and scope of the claims.

b. a hydrophobic fatty acid of from 12 to 36 carbon atoms
  wherein: the ratio amine equivalent:acid ranges from 1:0.5 to 1:1.
2. The aqueous fluid of claim 1 wherein the fatty acid is oleic acid.
3. The aqueous fluid of claim 1 wherein the amount of the thickener is 1 wt% to 30 wt%.
4. The aqueous fluid of claim 1 wherein the amount of thickener is from 5 wt% to 20 wt%.
5. The aqueous fluid of claim 1 which additionally comprises organic solvent.
6. The aqueous fluid of claim 1 which additionally comprises ethylene glycol.
7. An aqueous fluid comprising an effective thickening amount of a thickener comprising the reaction product of:
  a. a polyoxyalkylene diamine of the formula:

$H_2NCH(CH_3)CH_2O(CH_2CH(R)O)_xCH_2CH(CH_3)NH_2$ wherein: from 1% to 30% of R is methyl and the remaining R is hydrogen, and x is a number such that the molecular weight of the polyoxyalkylene diamine ranges from 3000 to 9000; with
  b. a hydrophobic fatty di acid of 36 carbon atoms
    wherein: the ratio amine equivalent:acid is about 1:0.5.
8. The aqueous fluid of claim 7 which additionally comprises oleic acid.
9. The aqueous fluid of claim 7 wherein the amount of the thickener is 1 wt% to 30 wt%.

TABLE 1

| Example | Jeffamine® Diamine | Amount (gram) | (c) Fatty Acid | Amount (gram) | Viscosity cs @ 100° F., 10% in water | (a) Vis cs @ 40° C., % in aqueous ethylene glycol 10% | 15% | 20% | (b) Wt % Required For 40 cs Vis @ 40° C. |
|---|---|---|---|---|---|---|---|---|---|
| 1. | ED-6000 | 120 | C36 dimer acid | 7.2 | 22.08 | 43.93 cs | 350 cs | 1313 cs | 9.8 wt % |
| 2. | ED-6075 | 120 | C36 dimer acid | 7.2 | 32.16 | 62.66 | 727 | 2723 | 9.5 |
| 3. | ED-6000 | 120 | C36 dimer acid + Oleic acid | 3.6 | 11.99 | 23.54 | 71.78 | 157.6 | 14.5 |
| 4. | ED-6075 | 120 | C36 dimer acid + Oleic acid | 3.6 3.6 | 10.97 | 24.45 | 73.66 | 226 | 14.5 |
| 5. | ED-6000 | 50 | Epon® 828 + Oleic acid | 1.65 3.3 | 189 | 61.50 | 268 | 784 | 8.7 |
| 6. | ED-6075 | 50 | Epon® 828 + Oleic acid | 1.65 3.3 | 178 | 70.46 | 265 | 598 | 7.8 |
| 7. | ED-6000 | 120 | Oleic acid | 7.2 | 11.51 | 19.95 | 48.88 | 94.3 | 14.0 |
| 8. | ED-6075 | 120 | Oleic acid | 7.2 | 20.98 | 13.46 | 56.20 | 122 | 13.5 |
| 9. | ED-6000 | 120 | Adipic acid | 1.8 | 1.51 | 8.80 | 14.56 | 22.9 | 27.5 |

(a). Solution in 1:1 w/w ethylene glycol/water.
(b). Solution in 1:1 w/w ethylene glycol/water formulated for a fire resistant hydraulic fluid.
(c). Fatty acid is mixed with Jeffamine® diamine at 220° C. for four hours under nitrogen atmosphere.
Emory® 1010-C36 dimer acid.
Epon® 828 is a diglycidyl ether of bisphenol A.

What is claimed is:
1. An aqueous fluid comprising an effective thickening amount of a thickener comprising the reaction product of:
  a. a polyoxyalkylene diamine of the formula:

$H_2NCH(CH_3)CH_2O(CH_2CH(R)O)_xCH_2CH(CH_3)NH_2$ wherein: from 1% to 30% of R is methyl and the remaining R is hydrogen, and x is a number such that the molecular weight of the polyoxyalkylene diamine ranges from 3000 to 9000; with 10. The aqueous fluid of claim 7 wherein the amount of thickener is from 5 wt% to 20 wt%.
11. The aqueous fluid of claim 7 which additionally comprises organic solvent.
12. The aqueous fluid of claim 7 which additionally comprises ethylene glycol.
13. An aqueous fluid comprising an effective thickening amount of a thickener comprising the reaction product of:
  a. a polyoxyalkylene diamine of the formula:

$H_2NCH(CH_3)CH_2O(CH_2CH(R)O)_xCH_2CH(CH_3)NH_2$ wherein: from 1% to 30% of R is methyl and the remaining R is hydrogen, and x is a number such that the molecular weight of the polyoxyalkylene diamine ranges from 3000 to 9000; with b. a hydrophobic fatty mono acid of 18 carbon atoms wherein: the ratio amine equivalent:acid ranges from 1:0.5 to 1:1.

14. The aqueous fluid of claim 13 wherein the fatty acid is oleic acid.

15. The aqueous fluid of claim 13 wherein the fatty acid is stearic acid.

16. The aqueous fluid of claim 13 wherein the amount of the thickener is 1 wt% to 30 wt%.

17. The aqueous fluid of claim 13 wherein the amount of thickener is from 5 wt% to 20 wt%.

18. The aqueous fluid of claim 13 which additionally comprises organic solvent.

19. The aqueous fluid of claim 13 which additionally comprises ethylene glycol.

20. The aqueous fluid of claim 13 wherein the ratio of amine equivalent:acid is about 1:1.

* * * * *